Patented Jan. 29, 1952

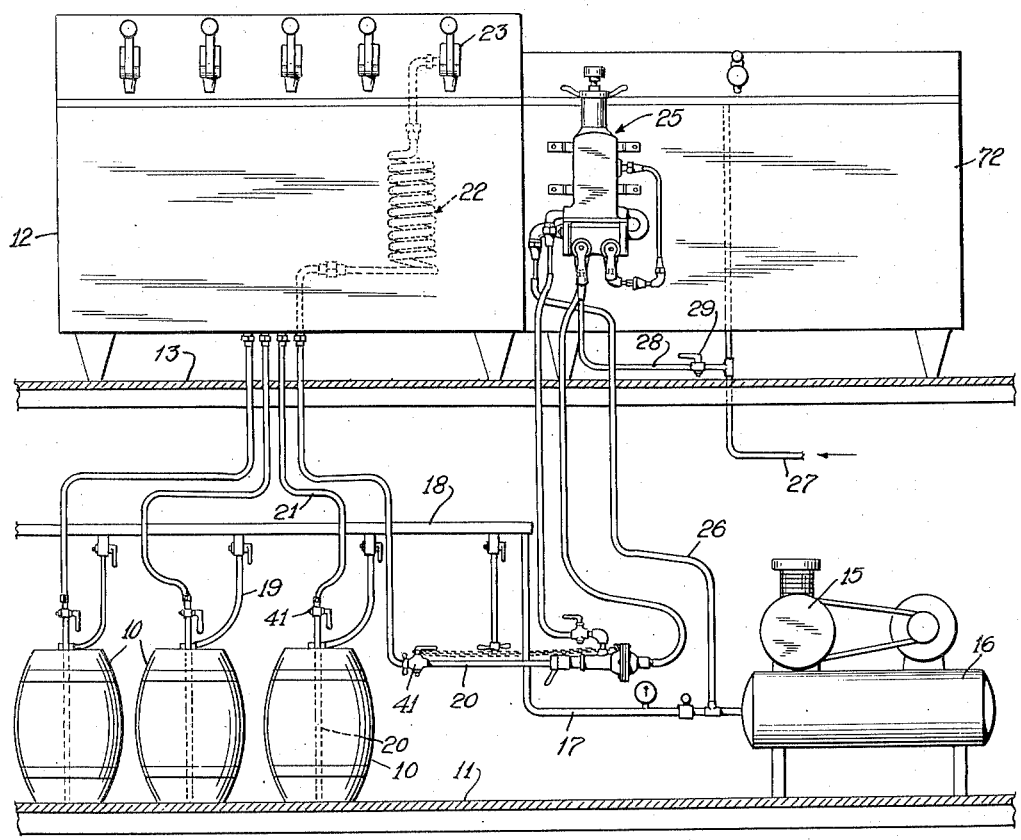

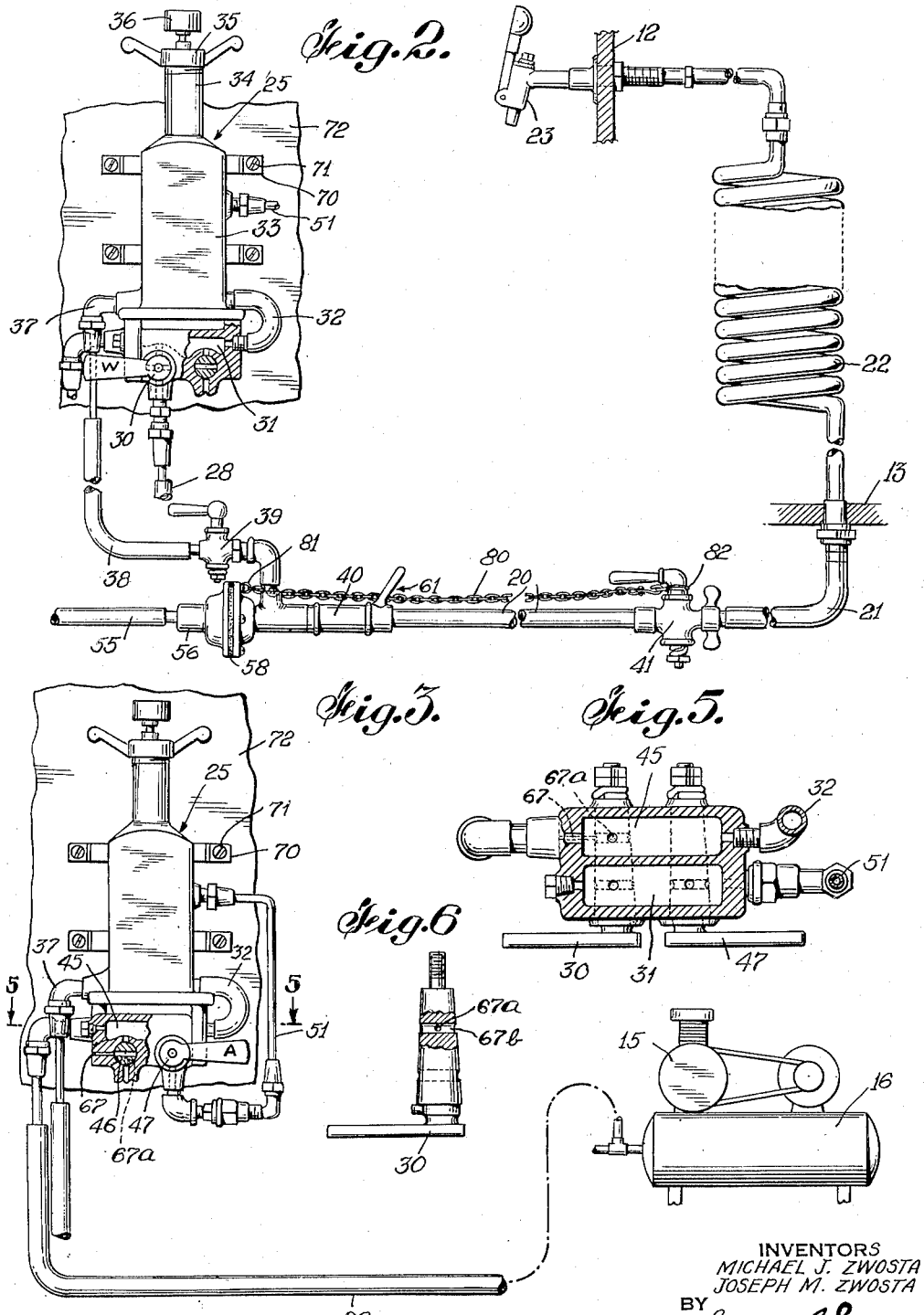

2,583,982

UNITED STATES PATENT OFFICE 2,583,982

CLEANING AND TESTING APPARATUS FOR BEER DISPENSING SYSTEMS

Michael J. Zwosta and Joseph M. Zwosta, Brooklyn, N. Y.

Application May 2, 1950, Serial No. 159,528

8 Claims. (Cl. 225—12)

This invention relates to cleaning and testing apparatus for beer dispensing systems, and the like. It constitutes an improvement over the pipe cleaning apparatus shown and described in Patent No. 2,443,550, issued to applicant Michael J. Zwosta on June 15, 1948.

The patented apparatus performs very satisfactorily as the patent clearly shows, but the installation costs and problems which the patented apparatus involves, have rendered it somewhat difficult to introduce upon the market and it became, accordingly, necessary to devise simplified apparatus which might be installed in the average bar or saloon with very little difficulty and at very little cost. The beer dispensing system cleaning apparatus which is described and claimed in the present application constitutes just such improved apparatus.

It is the principal object of this invention to provide cleaning and testing apparatus for beer dispensing systems and the like which may be utilized for the purpose of cleaning and testing beer dispensing systems without being made a permanent part thereof and without involving any change whatsoever in the apparatus of the beer dispensing system. The cleaning and testing apparatus herein claimed is permanently installed adjacent the beer dispensing apparatus but it is not installed in said beer dispensing apparatus, to become an integral part thereof. It is a permanent installation in the sense that it is not portable cleaning apparatus which is carried from one bar to another, but in no respect whatsoever does it become a component part of the beer dispensing apparatus itself.

More specifically, the cleaning and testing apparatus which is herein claimed is hooked up to an air compressor and to a source of water supply. When a keg of beer is emptied during the course of normal business, it is detached from its beer rod preparatory to returning it to the brewery. The beer rod is now inserted into a suitable receptacle connected to the cleaning apparatus and a mixture or solution of water and cleaning material may then be sent through the beer rod and the entire beer line system including the cooling coils and the dispensing faucet. Compressed air may also be sent through the same beer dispensing system to assist the water and the cleaning material to thoroughly clean out the beer dispensing system. The compressed air may also be used to blow the dispensing system clean of all foreign matter, including the water and cleaning material solution. And finally, the compressed air may be used to test the apparatus for leaks. When this job is done, the beer line system is refilled with water and the beer rod may be detached from the receptacle and inserted into a full keg of beer. The beer dispensing system is now as clean as a whistle and full of clean water. The beer which it dispenses forces the water out of the system and it in turn is as clear in the glass as it is in the keg. A saving of beer is thereby effected.

Another object of this invention is the provision of beer dispensing system cleaning apparatus of the character described which includes a safety device for preventing a flow of water when the cleaning apparatus is detached from the apparatus of the beer dispensing system. The cleaning apparatus remains permanently connected to a source of water supply and it remains permanently connected to a source of air under pressure, but at no time will water pass through the cleaning apparatus either under its own pressure or under the pressure of the compressed air, unless the cleaning apparatus is properly hooked up to the apparatus of a beer dispensing system. More specifically, the receptacle in the cleaning apparatus which receives the beer rod of the dispensing apparatus includes a safety valve which is closed at all times except when the beer rod is introduced therein. In other words, it is the beer rod itself which opens the safety valve and unless the beer rod is inserted into its receptacle, the safety valve will be and remain closed.

A preferred form of this invention is shown in the accompanying drawing in which:

Fig. 1 is a view of the entire cleaning and testing apparatus and a typical beer dispensing system, showing the dispensing faucets and the cooling coil on the main floor, and the control apparatus of the cleaning system installed adjacent said dispensing faucets, and showing a plurality of beer kegs on the floor below together with an air compressor, and the receptacle of the cleaning system which receives the beer rod of the dispensing system.

Fig. 2 is an enlarged, fragmentary view, partly broken away and in section, of the beer dispensing and cleaning systems, showing the two systems interconnected with each other for the cleaning operation.

Fig. 3 is a similar view of the cleaning apparatus, showing its compressed air system.

Fig. 4 is a fragmentary enlarged view, partly broken away and in section, of the safety valve features of the present invention.

Fig. 5 is a sectional view through the control valve of the system.

Fig. 6 is a top view, partly broken away and in section, of one of the valve members shown in Fig. 5.

Fig. 1 illustrates a typical installation. It shows a plurality of beer kegs 10, standing on the floor 11 of a cellar or basement and beer cooling and dispensing apparatus 12 standing on main floor 13 of a typical bar or similar establishment. A compressor 15 connected to a compressed air tank 16 provides the necessary compressed air for dispensing the beer from the beer kegs and also for cleaning the beer dispensing systems, as will hereinafter more fully appear. A pipe 17 connects the compressed air tank 16 to a manifold or distributing head 18 which, in turn, is connected by means of several lengths of hose 19 to the barrels 10. Each barrel has its own beer rod 20 mounted therein and each said beer rod is connected by means of a suitable hose 21 to the cooling system of the beer dispensing system. More specifically, it connects with cooling coil 22 and said coil is connected to a dispensing faucet 23. This is a typical beer dispensing system and there may be several such systems in a given bar. In Fig. 1, for example, there are four such beer dispensing systems and each system is connected to a separate keg of beer.

It is the beer rod 20 which serves as the link between the beer dispensing and cleaning systems. When a keg of beer is emptied of its contents during the normal course of business, its beer rod 20 is withdrawn therefrom and its compressed air feed hose 19 is disconnected therefrom. The beer rod is then hooked up to the cleaning apparatus 25 which is herein described and claimed and the cleaning process then takes place in the manner which will hereinafter more fully appear. At the conclusion of the cleaning operation, the beer rod is withdrawn or detached from the cleaning apparatus and it is then inserted into a full, fresh keg of beer. The compressed air feed hose 19 is once again hooked up to the keg and the beer dispensing system is now ready to dispense clean, clear beer.

It will be seen in the drawing that a pipe 26 connects the cleaning apparatus to pipe 17 of the compressed air system above mentioned. It is through said pipe 26 that the cleaning apparatus receives air under pressure. Pipe 27 is connected to a source of water under pressure and a pipe 28 connects said pipe 27 to the cleaning apparatus. A valve 29 in said pipe line 28 controls the flow of water therethrough.

Fig. 2 shows how the water is made to flow through the cleaning apparatus and through the beer dispensing apparatus to clean the latter. Pipe 28 is connected to a valve 30 which will hereinafter be designated as the water valve and when said valve is opened, the water will flow through the valve chamber 31, and through connecting pipe 32, to the mixing chamber 33 of the cleaning apparatus. There is an inlet pipe 34 at the top of said mixing chamber through which a cleaning fluid or powder may be introduced into said mixing chamber. A cap 35 closes said inlet opening and a pressure gauge 36 registers the pressure within said mixing chamber. When the water enters the mixing chamber, it mixes with the cleaning fluid or powder as the case may be. It rushes into the chamber with considerable force and swirls around the chamber to form a homogeneous mixture or solution with the cleaning material. The cleaning mixture or solution then leaves the mixing chamber through pipe 37 and it then passes through hose 38 and through valve 39. Then it passes into a clamping receptacle 40 which receives the beer rod 20, it passes through said beer rod, the valve 41 at the top end thereof, and thence into and through beer line 21, coil 22, and dispensing faucet 23.

Fig. 3 shows the air system of the cleaning and testing apparatus herein claimed. Compressed air pipe line 26 carries the compressed air to an air chamber 45 which has two outlets controlled, respectively, by valves 46 and 47. Valve 46 controls the flow of compressed air to the safety air valve (hereinafter described) and valve 47 controls the flow of compressed air through the cleaning and testing apparatus and beer system. When valve 47 is open, the compressed air passes through said valve and through a pipe 51 and then into the mixing chamber or tank 33 where it mixes with, and agitates, the cleaning solution. From this point on, the compressed air travels the same path as the cleaning fluid. When the water valve is open and the air valve is closed, only the water will pass through the cleaning apparatus and the beer dispensing apparatus in the manner above described. When both the water and air valves are open, both the cleaning fluid and the compressed air will travel through said cleaning apparatus and said beer dispensing system, and the compressed air will lend energy to the cleaning fluid to assist in cleaning the pipe line. When the water valve is closed and the air valve is open, the compressed air will pass through the cleaning apparatus and the beer dispensing system to blow it through.

The beer dispensing system may be tested for leaks by simply closing the dispensing faucet and introducing compressed air into said system. A pressure of 40 or 45 pounds will render it possible to detect leaks very quickly. Should the pressure as indicated on gauge 36 drop within a matter of minutes, a leak would be indicated; should the pressure remain constant, the absence of leaks would be indicated. This is a very sure test for leaks which today cost the owners of beer dispensing establishments many thousands of dollars each week for beer losses through leaks.

The safety valve system will now be described. It will be noted that the same valve which controls the flow of water, namely water valve 30, also controls another valve, to wit: air valve 46 above mentioned, which allows the compressed air to flow out of air chamber 45 and into a hose 55. This hose 55 is connected to a diaphragm valve 56 as is clearly shown in Fig. 4. More specifically, diaphragm valve 56 controls safety valve 57 in receptacle 40. Diaphragm 58 of the diaphragm valve normally bears against safety valve 57 and holds said safety valve snug against its seat 59 to close receptacle 40 and prevent the flow of water therethrough from valve 39. Valve 57, however, has a long stem 60 which the beer rod 20 engages when it is inserted into receptacle 40 and clamped in place therein by means of clamp 61. A compression spring 62 normally holds diaphragm 58 in engagement with valve 57 to close said valve but when the beer rod is inserted into receptacle 40, said rod engages stem 60 of valve 57 and overcomes the action of spring 62 to open said valve. Water may now flow through valves 39 and 57 and into beer rod 20, and thence into and through the entire beer dispensing system. To assist spring 62 in normally holding 57 in closed position, hose 55 carries compressed air from air chamber 45 and valve 46 to the diaphragm valve 56. This compressed air enters the air chamber 65 of said diaphragm valve and presses rightwardly against diaphragm 58 as viewed in Fig. 4. Thus, the combined pressure of the compressed air and the compression spring 62 tends to hold valve 57 in closed position against its seat 59. It is only when the beer rod 20 is inserted into receptacle 40 and against valve stem 60 that said valve 57 opens for the passage of water therethrough.

It would manifestly be very difficult to insert beer rod 20 into its receptacle 40 against a force of 40 or 45 pounds per square inch exerted by the compressed air on the opposite side of valve diaphragm 58. Hence it is necessary to bleed the compressed air through an escape vent 67 on air chamber 45. This vent is controlled by the air valve 46 so that when valve 46 opens, vent 67 closes and when valve 46 closes, vent 67 opens. More specifically, a valve opening 67a is provided in air valve 46 and it communicates on one side of said air valve with the air valve opening 67b. When the air valve 46 is in closed position, communication with air chamber 45 will be cut off. Communication, however, between vent 67 and the safety air hose 55 will be provided through opening 67a and the air valve opening 67b which now registers with said vent 67.

In this connection, it is important to note that beer rod 20 has a closed end 20a, and communication with the inside of said beer rod may be had through holes 20b in the side wall of said rod. It is the closed end 20a of the beer rod which engages valve stem 60 when the beer rod is inserted into receptacle 40, to unseat valve 57 and thereby open said valve. It is also important to note that clamp 61 is simply a tubular member having a handle 61a and being in screw-threaded engagement with receptacle 40. The tubular member engages a rubber ring 61b and compresses said ring and thereby causes it to expand inwardly and against beer rod 20, thereby clamping said beer rod in place in receptacle 40.

The foregoing is descriptive of a preferred form of the invention. It will be understood that the cleaning apparatus hereinabove described may be modified in many ways, and other forms of the invention may be provided, all within the broad scope and spirit of the invention. For example, the mixing tank 33 is shown provided with a plurality of brackets 70 whereby it may be fastened by means of screws or bolts 71 to cabinet 72, adjacent cooler 12. This is but illustrative of the several locations where the mixing tank and its appended valves may be placed for convenient operation. The specific types of valve which are shown in the drawing should also be taken as being purely illustrative of the many kinds of valves which may be used in connection with the present invention.

An optional safety feature is the chain 80 which is best shown in Fig. 2. This chain may be attached by means of an eye-bolt 81 to the housing of diaphragm valve 56 and it may be detachably hooked to a ring 82 on the housing of valve 41. This arrangement may be used for safety purposes to prevent accidental dislodgement of the beer rod under the pressure of the compressed air in the beer cleaning system and also the diaphragm valve 56.

We claim:

1. Cleaning apparatus of the character described, comprising a mixing tank, an opening in said mixing tank through which cleaning material may be introduced into said mixing tank, a closure for said opening, a pipe providing communication between said mixing tank and a water supply source, a manually controlled valve in said pipe controlling the flow of water into said mixing tank, a second pipe providing communication between said mixing tank and a compressed air source, a manually controlled valve in said second pipe controlling the flow of compressed air into said mixing tank, a receptacle for a beer rod, a third pipe providing communication between said mixing tank and said beer rod receptacle, a manually controlled valve in said third pipe controlling the flow from said mixing tank to said receptacle, a compressed air controlled diaphragm valve in said third pipe, also controlling the flow from said mixing tank to said receptacle, and a fourth pipe providing communication between said second pipe and said diaphragm valve.

2. Cleaning apparatus in accordance with claim 1, wherein the diaphragm valve is normally closed in response to the air pressure in said fourth pipe.

3. Cleaning apparatus in accordance with claim 2, wherein a compression spring engages the diaphragm valve and urges said valve into closed position.

4. Cleaning apparatus in accordance with claim 3, wherein the diaphragm valve is provided with a valve stem which is engageable by the beer rod to open said diaphragm valve against the action of the compressed air in the fourth pipe and against the action of the compression spring.

5. Cleaning and testing apparatus of the character described, comprising a mixing tank, an opening in said mixing tank through which cleaning material may be introduced into said mixing tank, a closure for said opening, a pipe providing communication between said mixing tank and a water supply source, a manually controlled valve in said pipe controlling the flow of water into said mixing tank, an air chamber adjacent said mixing tank, a second pipe providing communication between said air chamber and a compressed air source, a third pipe providing communication between said air chamber and the mixing tank, a manually controlled valve in said air chamber controlling the flow of compressed air from said air chamber to said mixing tank, a receptacle for a beer rod, a fourth pipe providing communication between the mixing tank and the beer rod receptacle, a manually controlled valve in said fourth pipe controlling the flow from said mixing tank to said beer rod receptacle, a compressed air controlled diaphragm valve connected to said fourth pipe, also controlling the flow from said mixing tank to said beer rod receptacle, and a fifth pipe providing communication between the air chamber and the said diaphragm valve.

6. Apparatus in accordance with claim 5 wherein a manually controlled valve is provided in the fifth pipe to control the flow of compressed air from the air chamber to the diaphragm valve.

7. Apparatus in accordance with claim 6 wherein the valve in the first mentioned water pipe, and the valve in the fifth pipe, are connected to each other for simultaneous operation of both said valves, whereby opening said valves causes a flow of water from the water supply source to the mixing tank and a simultaneous flow of compressed air from the air chamber to the diaphragm valve, and whereby closing said valves stops the flow of water from the water supply source to the mixing tank and simultaneously stops the flow of compressed air from the air chamber to the diaphragm valve.

8. Apparatus in accordance with claim 7 wherein an air escape vent is provided adjacent the valve in the fifth pipe, a passage being formed in said valve which provides communication between the fifth pipe and the air escape vent when said valve is in closed position.

MICHAEL J. ZWOSTA.
JOSEPH M. ZWOSTA.

REFERENCES CITED

The following references are of record in the file of this patent:

UNITED STATES PATENTS

| Number | Name | Date |
|---|---|---|
| 831,635 | Strunce | Sept. 25, 1906 |
| 927,893 | Steiger | July 13, 1909 |
| 988,899 | Ryan | Apr. 4, 1911 |